Jan. 18, 1966   P. H. SAVET   3,229,520
SPACE NAVIGATION USING DIFFERENTIAL ACCELEROMETERS
Filed June 27, 1960   2 Sheets-Sheet 1

INVENTOR.
PAUL H. SAVET
BY Raymond A. Paquin
ATTORNEY.

United States Patent Office 3,229,520  
Patented Jan. 18, 1966

3,229,520  
SPACE NAVIGATION USING DIFFERENTIAL ACCELEROMETERS  
Paul H. Savet, Westbury, N.Y., assignor to American Bosch Arma Corporation, a corporation of New York  
Filed June 27, 1960, Ser. No. 39,053  
6 Claims. (Cl. 73—178)

The present invention relates to accelerometers and has particular reference to acceleration gradient measurements and uses therefor.

It has been said that the measurement of acceleration aboard a coasting space vehicle is meaningless since no overall acceleration in a coasting vehicle prevails. However, this statement is true only if the center of gravity of the satellite is considered. Since the gravitational field in which a vehicle is moving is non-uniform, this non-uniformity can be used to provide the information upon which an exploration-of-space trajectory is based.

If, for example, an exploratory space vehicle is circling the earth, the differential acceleration existing at separated locations on the vehicle can be used to provide information leading to the determination of the orientation of the gravity vector and the distance of the earth's center from the satellite or the gravitational constant of the earth at the position in space occupied by the vehicle.

It is, therefore, an object of this invention to enable detection of the differential accelerations existing in a space vehicle.

It is an object of this invention to employ the detected differential accelerations in solution of problems related to space navigation.

It is an object of this invention to employ the detected differential accelerations in solution of problems related to space exploration.

Until the present invention, the gravity gradient has been neglected as a useful reference of space navigation. Although the present state of knowledge may restrict its usefulness to the vicinity of the earth, there is no reason why the same device cannot be used in the gravitational field of other planets as more information concerning these environments are obtained.

There are many specific applications of differential accelerometers to space navigation and exploration which will exemplify the varied uses to which they can be put. For example, differential accelerometers mounted on an inertial platform in a satellite vehicle may be used to slave the platform into continuous alignment with the equipotential surfaces of gravity to thereby continuously determine the attitude of the vehicle with respect to the local vertical. Also, slaving can be applied to the orbital plane and the angular velocity of the satellite in its orbit can be derived directly. The gradient detector system may be used to reorient the drifting inertial system components in an inertial guidance system to correct the attitude, position and velocity errors which accumulate during long flight times. In any navigation system, the gradient detector can be used to generate redundant navigational information and thus improve overall accuracy of the system.

For a more complete understanding of the invention reference may be had to the accompanying diagram, in which:

FIG. 3 is a diagram indicating one instrumentational embodiment including the differential accelerometer;

FIG. 4 is a modification of FIG. 3; and

FIG. 5 is illustrative of one of the computer constructions which may be used in FIG. 3.

Figure 1:
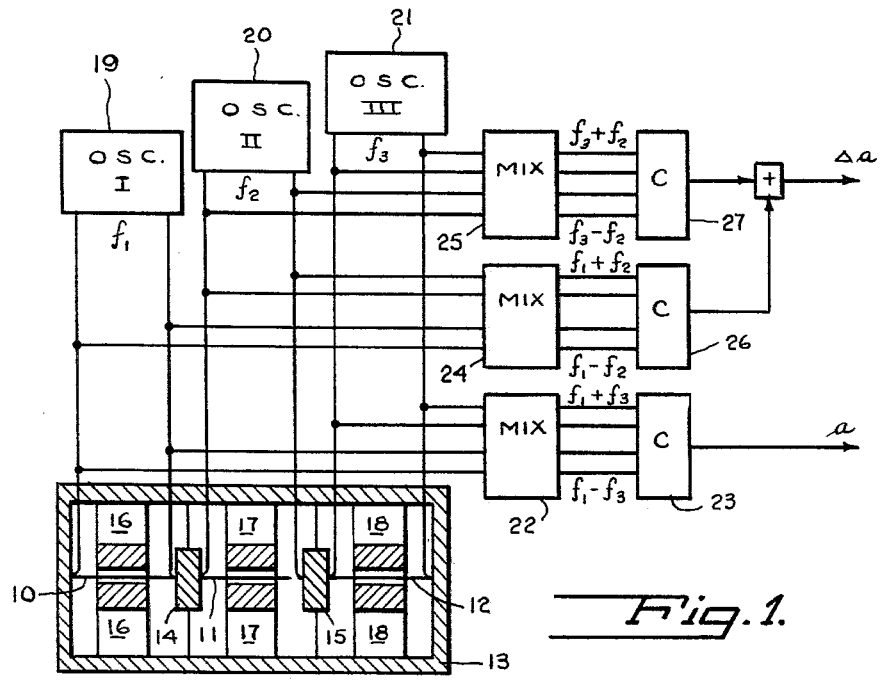
FIG. 1 shows the preferred embodiment of a differential accelerometer.

Referring first to FIGURE 1 of the diagrams, the basic differential accelerometer is shown. This differential accellerometer in itself is described and claimed in my copending application Serial No. 420,380, filed December 22, 1964, and entitled Differential Accelerometer. It may not seem to differ in appearance from the earlier vibrating string accelerometer disclosed in copending patent application Serial No. 586,615, filed May 22, 1956 but it does differ in the physical construction and the external auxiliary apparatus. In this accelerometer, three similar axially aligned electrically conducting strings 10, 11, 12 are stretched between the ends of a frame 13. Interposed between strings 10 and 11 is a mass 14 and interposed between strings 11 and 12 is a mass 15. The three strings 10, 11, 12 are located in the transverse magnetic fields of the several magnets 16, 17 and 18 respectively. Electronic oscillators 19, 20, 21 are connected across the ends of the wires 10, 11, 12 respectively, and in accordance with well known phenomena keep the strings vibrating at their natural frequencies. It is known that the frequency of vibration is dependent upon the tension in the strings as well as the physical characteristics (such as length, cross section, elastic modulus, etc.) of the strings and can be expressed as $$f = K\sqrt{T} \qquad (1)$$

where K is a constant and T is the tension in the wire.

Assuming that the masses 14, 15 are equal to M and are subject to axial components of acceleration as defined below, and that the strings are all identical and not stressed beyond the region of Hooke's law then $$T_{10} = T_0 + \Delta T_{10} = T_0 + \tfrac{1}{3}[-3Ma_0 + M\Delta a]$$
$$T_{11} = T_0 + \Delta T_{11} = T_0 + \tfrac{1}{3}[-2M\Delta a] \qquad (2)$$
$$T_{12} = T_0 + \Delta T_{12} = T_0 + \tfrac{1}{3}[3Ma_0 + M\Delta a]$$

where $T_0$ is the initial tension in the wires $a_0$ is the average of the accelerations of the separate masses 14, 15, i.e. acceleration of rigid frame 13, assumed free of extension, $\Delta a$ is the differential acceleration between the actual acceleration and the average acceleration of each mass 14, 15, $T_{10}$, $T_{11}$, $T_{12}$ are the total tensions of wires 10, 11, 12, $\Delta T_{10}$, $\Delta T_{11}$, $\Delta T_{12}$, are the changes in tension of wires 10, 11 and 12 respectively produced by acceleration.

The difference in the tension of strings 10 and 12 is $$T_{12} - T_{10} = 2Ma_0 \qquad (3)$$

and the difference between the sum of the tensions in the outer string and twice the inner string tension is $$T_{10} + T_{12} - 2T_{11} = 2M\Delta a \qquad (4)$$

Thus, the tensions in the strings can be employed to measure both the acceleration of frame 13 and the differential acceleration at the positions of the masses 14 and 15.

The string tensions are related to their natural frequency of vibration according to Equation 1 so that in terms of frequency, Equations 3 and 4 become $$(F_{12}{}^2 - f_{10}{}^2) = 2K^2 M a_0 \qquad (5)$$

and $$f_{10}{}^2 + f_{12}{}^2 - 2f_{11}{}^2 = 2MK^2 \Delta a \qquad (6)$$

Equations 5 and 6 may be reduced to:

$$(f_{12} - f_{10})(f_{12} + f_{10}) = K' a_0 \qquad (7)$$

and $$(f_{10} - f_{11})(f_{10} + f_{11}) + (f_{12} - f_{11})(f_{12} + f_{11}) = K' \Delta a \qquad (8)$$

FIGURE 1 shows in schematic form the apparatus for determining the acceleration "a" according to Equation 7 by combining the sum and difference of the two outer string frequencies (determined in mixer 22) (and used in computer 23) and conforms to the prior art. An additional utility of the apparatus is found in the determination of the differential acceleration $\Delta a$ by the addition of the center sensing wire 11 and determining the difference and sum frequencies between each of the frequencies of the two outer strings 10, 12 and the frequency of the center string 11 in respective mixers 24, 25 multiplying sums and differences as indicated by Equation 8, accomplished in computers 26, 27 and adding the products together at 28.

A knowledge of the differential acceleration on the two separated masses 14, 15 will be invaluable in outer space navigation and is particularly adapted for control of orbiting vehicles such as satellites as will be described in what follows.

Figure 2:
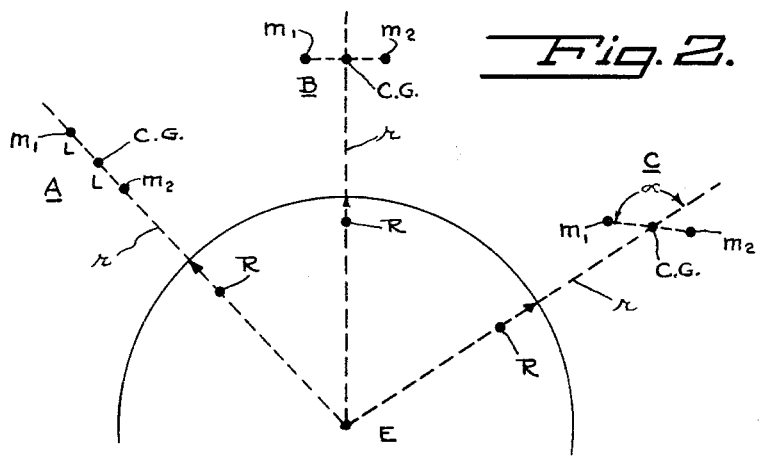
FIG. 2 is an explanatory diagram illustrating the basis for the use of the differential accelerometer on space vehicles.

Referring now to FIGURE 2 of the drawings, the theoretical aspects of the use of acceleration gradient effects will be made clear. Let two masses $m_1$ and $m_2$ be positioned as at A in FIGURE 2, i.e. along a radial line from the center of the earth with the center of gravity (C.G.) of the masses at a distance $r$ from the center of the earth, and separated by a distance $2L$, it will be seen that the mass $m_2$ is subject to a greater acceleration of gravity than $m_1$ since $m_2$ is closer to the center of the earth, and that the differential acceleration on the two masses is directed so as to separate them in the axial direction. In position B where the line joining the masses is perpendicularly disposed to the radial line $r$, the masses will tend to move toward each other as they are attracted to the center of the earth along radial lines, and the component of the attractive force along the line joining the masses is directed toward the center of gravity from each of the masses.

Intermediate of these positions, as at $r$, the lines joining masses $m_1$, $m_2$ is displaced by an angle $\alpha$ from the radial line $r$ and this represents the general condition. In the specific condition where $\alpha = 54.7°$ the differential acceleration is zero.

If the system of masses undergoes an angular velocity about an axis through the center of gravity perpendicular to the line joining the masses, an additional differential acceleration equal to the centrifugal acceleration is created. The total differential acceleration therefore is the sum of the gravitational and centrifugal effects.

Navigational apparatus employing the differential acceleration indications can be constructed according to the concepts which follow. Refer to FIGURE 3. A pair of differential accelerometers 30, 31 are mounted on a platform 32 in a manner such that the sensitive axes of accelerometers 30, 31 are perpendicular to each other, and are in the plane of, or parallel to, the platform 32, FIGURE 3. The rectangles 30a, 31a represent the auxiliary equipment required to convert the tensions of the wires into usable signals and include the auxiliary apparatus of FIGURE 1. The platform is mounted for universal rotation on the frame 33 of the air vehicle which may be a satellite, for example, orbiting around the earth. It shall be assumed that the inertial attraction is negligible between each of the masses and the distributed mass of the vehicle, that the orbital motion is planar and that the accelerometers 30, 31 are kept coplanar with the orbit by control means not shown.

The differential centrifugal effect, along the axis of each accelerometer, of rotation of that accelerometer about a perpendicular axis is equal to twice $$L\left(\frac{d\phi}{dt}\right)^2$$

where L is one half of the distance between the masses and $d\phi/dt$ is the angular velocity of the accelerometer in inertial space.

A rate gyro 35 mounted on the platform 32 with the input axis perpendicular to the orbital plane (i.e. perpendicular to the plane of the paper in FIGURE 3) continuously measures the angular velocity $d\phi/dt$ of the platform 32 in the plane of the trajectory, and the computer 36 determines $$L\left(\frac{d\phi}{dt}\right)^2$$

according to the signal obtained from gyro 35. The differential acceleration of each system can be mathematically expressed as:

$$\Delta a_{30} = -2L\left(\frac{g}{r}\right)(1-3\cos^2\alpha_1) + 2L\left(\frac{d\phi}{dt}\right)^2 \quad (9)$$

$$\Delta a_{31} = -2L\left(\frac{g}{r}\right)(1-3\cos^2\alpha_2) + 2L\left(\frac{d\phi}{dt}\right)^2 \quad (10)$$

The outputs of the accelerometers 30, 31 are modified by output of computer 36 to obtain signals:

$$\theta_1 = \Delta a_{30} - 2L\left(\frac{d\phi}{dt}\right)^2 = -2L\frac{g}{r}(1-3\cos^2\alpha_1) \quad (11)$$

and $$\theta_2 = \Delta a_{31} - 2L\left(\frac{d\phi}{dt}\right)^2 = -2L\frac{g}{r}(1-3\cos^2\alpha_2) \quad (12)$$

Since $\alpha_1 + \alpha_2$ is equal to $\pi/2$, Equations 11, 12 can be solved simultaneously after substitution of $$\frac{\pi}{2} - \alpha_2$$

for $\alpha_1$. Thus, by proper mathematical manipulations, it will be found that $$\frac{\theta_1}{\theta_2} = \frac{1-3\sin^2\alpha_2}{1-3\cos^2\alpha_2}$$

and $$\frac{\theta_2 - \theta_1}{\theta_2 + \theta_1} = 3\cos 2\alpha_2 \quad (13)$$

Accordingly, the $\theta_1$ and $\theta_2$ signals obtained from accelerometers 30, 31 and computer 36 are combined in computer 37 which solves Equation 13 to produce an electrical or mechanical signal proportional to $\alpha_2$ and/or $$\frac{\pi}{2} - \alpha_2 = \alpha_1$$

Now with the value for $\alpha_1$ or $\alpha_2$ or both, determined in computer 37, Equation 11, or 12, can be solved for the value of the ratio of $g/r$ which is proportional to the magnitude of the gradient of the gravity field. Thus, rewriting Equation 12, $$\frac{g}{r} = \frac{\theta_2}{2L(1-3\cos^2\alpha_2)} \quad (14)$$

For instrumentation of the Equation 14, the $\theta_2$ and $\alpha_2$ signals previously composed are applied to the inputs of a computer 38 which operates on the input signals according to Equation 14 to produce the desired output signal proportion to $g/r$. Thus, the inclination of the platform with respect to the radial line from the earth can be found and the location of the platform along that line also can be found by the differential acceleration measurements. This positional information can be continuously monitored and fed to various instruments for correlating environmental data with position, for example, or for use in navigational apparatus.

In an alternate arrangement shown in FIGURE 4, the differential accelerations $\Delta a_{31}$ and $\Delta a_{30}$ are matched and the difference is used to energize a motor 39 which drives the platform 32 in azimuth until the signals $\Delta a_{30}$ and $\Delta a_{31}$ are equal. When this happens, it will be seen that $\alpha_1$ is equal to $\alpha_2$ and the local vertical lies on the line bisecting the angle formed by the sensitive axes of the differential accelerometers 30 and 31.

Since $\alpha_1$ and $\alpha_2$ are equal, each angle must be equal to 45° whence Equations 9 and 10 both reduce to $$\Delta a = L\left(\frac{g}{r}\right) + 2L\left(\frac{d\phi}{dt}\right)^2 \quad (15)$$

where $\Delta a$ represents the output of either accelerometer 30, 31. The angular velocity of the platform is determined by the rate gyro 35 and $$2L\left(\frac{d\phi}{dt}\right)^2$$

is determined in computer 36. The output of computer 36 is combined with $\Delta a$ from either differential accelerometer, for example differential accelerometer 31, in the computer 40 which performs the operations to determine $g/r$ according to the equation:

$$\frac{g}{r} = \frac{1}{L}\left[2L\left(\frac{d\phi}{dt}\right)^2 - \Delta a\right] \quad (16)$$

Further, if $r$ is determinable by auxiliary apparatus, such as radar for example, then the value of gravity can be determined by multiplication of the $g/r$ ratio by the value of $r$ in a computing apparatus 41 which may be a simple potentiometric device for example. On the other hand, if the value of $g$ is known from some auxiliary source, division of the $g/r$ ratio by the known $g$ value will give the reciprocal of $r$.

The examples of FIGURES 3 and 4 are merely two of a vast number of instruments which can be based upon the differential accelerometer. The differential accelerometer of FIGURE 1 represents a preferred embodiment of a differential accelerometer but in its broader form envisions means for detecting the difference in the linear accelerations existing at two points of a vehicle along an axis parallel to the line joining the two points. This may be accomplished as in FIGURE 1 where the instrument gives the differential acceleration over the short distance of the center string 11, or by widely separated but accurately aligned accelerometers and means for determining the difference between their outputs. It should be noted that the differential acceleration is an extremely small value and extremely precise apparatus will be required. For example, the gravity gradient at the surface of the earth is on the order of $10^{-7}$ g/ft., and at thirty-six thousand miles above the earth it is only $10^{-10}$ g/ft., where $g$ is the acceleration of gravity at the surface of the earth.

The constructions of the various computing components shown as rectangles in the figures are not really necessary to an understanding of the invention since the synthesis of computer circuitry for given inputs and outputs according to given mathematical relationships follows a well defined pattern in the art. However, assuming that the difference acceleration signals which in FIGURE 1 are composed of difference frequency signals are converted to signals of constant frequency and proportional magnitude, the rectangles of FIGURES 2, 3 and 4 may operate as will be described for analog computing devices.

Computer 36 simply squares the $(d\phi/dt)$ signal from gyro 35 and changes it to a level which represents $$2L\left(\frac{d\phi}{dt}\right)^2$$

to the proper scaling for the other signals.

As shown in FIGURE 5, computer 37 receives at its inputs signals having magnitudes proportional to $$\theta_1 = \left[\Delta a_{30} - 2L\left(\frac{d\phi}{dt}\right)^2\right] \text{ and } \theta_2 = \left[\Delta a_{31} - 2L\left(\frac{d\phi}{dt}\right)^2\right]$$

and produces a mechanical signal proportional to $\alpha_2$ according to Equation 13. For example, the ratio of the difference and sum of $\theta_2$ and $\theta_1$ is obtained in a dividing circuit 50, the output is divided by three and is matched against the output of a resolver 51. The error signal energizes a motor 52 which drives the resolver 51 through 2:1 gearing until the displacement of resolver is $2\alpha_2$ and the output of resolver 51 is equal to $\cos 2\alpha_2$, and motor 52 is deenergized.

Computer 38 merely performs the division of $\theta_2$ by $2L(1-3\cos^2\alpha_2)$. For example, computer 38 first synthesized the $2L(1-3\cos^2\alpha_2)$ signal by using the $2\alpha_2$ signal from computer 37 (since $\cos^2\alpha_2 = \frac{1}{2} + \frac{1}{2}\cos 2\alpha_2$) and then divides the $\theta_2$ input by this signal according to Equation 14. Computer 40 simply subtracts the scaled $$\left(\frac{d\phi}{dt}\right)^2$$

and $\Delta a$ signals according to Equation 16.

In the matter above, it should be noted that in the demonstration of utility, analog computers have been used throughout for ease of description. However, in the practical realization of the circuits, it may be preferable, from an accuracy and weight standpoint, to employ digital computers to perform the required operations.

The possible uses of the differential accelerometers as the primary sensing element are innumerable. It should be noted that the two embodiments here described use only one pair of differential accelerometers since the motion is limited to an orbital plane, whereas complete navigational control would require as many as four differential accelerometers. Although the design of navigational instruments of the future may not be specifically taught by this specification, the utility of differential acceleration measurement in such instruments is demonstrated and the scope of the invention should be limited only by the scope of the appended claims.

I claim:

1. In a system for use in the vicinity of a celestial body: a space vehicle; a pair of differential accelerometers mounted on said vehicle, each of said differential accelerometers providing an output indicative of differences between the linear accelerations acting along a predetermined sensitive axis thereof at two spaced points along said axis, the sensitive axes of said differential accelerometers being inclined to each other; a rate gyro mounted on said vehicle and responsive to angular velocity thereof about an axis perpendicular to the sensitive axes of both of said differential accelerometers to produce an output representative of said angular velocity; and means supplied with the output of said rate gyro and the outputs of said differential accelerometers for deriving navigational information therefrom.

2. In a system for space navigation, a space vehicle, a platform on said vehicle and movable with respect thereto, a pair of differential accelerometers on said platform having their sensitive axes perpendicular to each other, each of said accelerometers producing an output indicative of differences between thte linear accelerations acting along the sensitive axis thereof at two separated points on said axis, a rate gyro on said platform responsive to angular velocity thereof about an axis perpendicular to said differential accelerometer axes to produce an output representative of said angular velocity, first computer means supplied with said output of said rate gyro and itself producing an output proportional to the square of said angular velocity, means for modifying said outputs of said accelerometers in response to said output of said first computer means, and second computer means supplied with said modified outputs of said accelerometers and responsive thereto to produce an output signal related to the ratio of the difference and sum of said modified accelerometer outputs.

3. In a system in accordance with claim 2, third computer means supplied with one of said modified differential accelerometer outputs and with said output of said second computer means and responsive thereto to produce an output representative of the gradient of the gravity field at said vehicle.

4. In a system for space navigation, a space vehicle, an inertial platform on said vehicle, a pair of differential accelerometers on said platform, each of said differential accelerometers providing an output indicative of differences between the linear accelerations acting along a predetermined sensitive axis thereof at two spaced points along said axis, the sensitive axes of said differential accelerometers being inclined to each other, motive means adapted to drive said platform about an axis perpendicular to the plane of the accelerometers, means for energizing said motive means according to the difference in outputs of said differential accelerometers to equalize said outputs of said differential accelerometers for orienting said platform according to the local gravity vector.

5. In a system for space navigation, a space vehicle, a platform on said vehicle, a pair of differential accelerometers on said platform oriented to have their sensitive axes perpendicular to each other, each of said accelerometers producing an output representative of differences between the linear accelerations acting along the sensitive axis thereof at two separated points on said axis, a rate gyro on said platform responsive to angular velocity thereof about an input axis perpendicular to said axes to produce an output representative of said angular velocity, and means for comparing said outputs of said differential accelerometers to obtain a difference signal, motive means for driving said platform about an axis parallel to said input axis of said gyro, said motive means being energized by said difference signal to drive said platform to a position for which the outputs of said differential accelerometers are substantially equal.

6. In a system in accordance with claim 5, first computer means supplied with said output of said rate gyro and responsive thereto to produce an output proportional to the square of said angular velocity, and second computer means supplied with said output of said first computer means and with the output of one of said differential accelerometers and responsive thereto to produce an output signal proportional to the difference between said outputs supplied thereto.

References Cited by the Examiner
UNITED STATES PATENTS

| | | | |
|---|---|---|---|
| 2,554,512 | 5/1951 | Varian | 73—178 |
| 2,613,071 | 10/1952 | Hansel | 73—178 |
| 2,893,248 | 7/1959 | Ecary | 74—5.34 |
| 2,928,667 | 3/1960 | Peterson | 73—505 |
| 2,928,668 | 3/1960 | Blasingame | 73—517 |
| 2,932,467 | 4/1960 | Scorgie | 244—77 |
| 2,944,426 | 7/1960 | Amara | 74—5.34 |
| 2,959,965 | 11/1960 | Holmes | 73—517 |
| 2,977,804 | 4/1961 | French | 73—178 |
| 3,028,592 | 4/1962 | Parr et al. | 244—77 |
| 3,031,154 | 4/1962 | Roberson et al. | 244—1 |

OTHER REFERENCES

Publication, "American Rocket Society Journal," an article by Frye and Stearns titled "Stabilization and Altitude Control of Satellite Vehicles," December 1959, pages 927–930.

ISAAC LISANN, *Primary Examiner.*

A. M. HORTON, ROBERT L. EVANS, ROBERT B. HULL, *Examiners.*